US012679061B2

(12) United States Patent
Beesley et al.

(10) Patent No.: US 12,679,061 B2
(45) Date of Patent: Jul. 14, 2026

(54) APPARATUS AND METHOD FOR HEATED PULP PRESS WITH INTEGRAL ELEMENTS FOR IMPROVED EFFICIENCIES

(71) Applicant: Motus LLC, Greenville, SC (US)

(72) Inventors: Robert Beesley, Greenville, SC (US); Jason Bedenbaugh, Greenville, SC (US)

(73) Assignee: Motus LLC, Greenville, SC (US)

( * ) Notice: Subject to any disclaimer, the term of this patent is extended or adjusted under 35 U.S.C. 154(b) by 169 days.

(21) Appl. No.: 18/596,805

(22) Filed: Mar. 6, 2024

(65) Prior Publication Data

US 2024/0300200 A1 Sep. 12, 2024

Related U.S. Application Data

(60) Provisional application No. 63/450,118, filed on Mar. 6, 2023.

(51) Int. Cl.

*B30B 15/34* (2006.01)
*B30B 11/04* (2006.01)
*D21F 13/00* (2006.01)
*D21J 3/00* (2006.01)

(52) U.S. Cl.

CPC .............. *B30B 15/34* (2013.01); *B30B 11/04* (2013.01); *D21F 13/00* (2013.01); *D21J 3/00* (2013.01)

(58) Field of Classification Search

CPC ......... B30B 15/34; B30B 11/04; D21F 13/00; D21J 3/00

See application file for complete search history.

(56) References Cited

U.S. PATENT DOCUMENTS

| | | | |
|---|---|---|---|
| 3,305,434 A | 2/1967 | Bernier et al. | |
| 4,514,353 A | 4/1985 | Alexander et al. | |
| 6,932,753 B1 | 8/2005 | Smith et al. | |
| 8,545,202 B2 | 10/2013 | Maatta et al. | |
| 9,011,308 B2 | 4/2015 | Treccani et al. | |
| 2016/0368235 A1 | 12/2016 | Kuo et al. | |
| 2022/0064869 A1 * | 3/2022 | Yamazaki .......... | B65D 43/0212 |

FOREIGN PATENT DOCUMENTS

| | | |
|---|---|---|
| CN | 201785677 U | 4/2011 |
| CN | 215629034 U * | 1/2022 |
| WO | 2022072555 A1 | 4/2022 |

OTHER PUBLICATIONS

English translation of CN-215629034-U retrieved from Espacenet (Year: 2025).*

* cited by examiner

*Primary Examiner* — Abbas Rashid
*Assistant Examiner* — Elisa H Vera
(74) *Attorney, Agent, or Firm* — Thrive IP®; Alexander Joseph Gambino; Jeremy M. Stipkala

(57) ABSTRACT

A pulp molding machine and split heater plate assembly are contemplated for the manufacture of molded pulp products. The heater plate assembly is split into upper and lower planar members, with grooves formed at the interfacing area of these members and individual cartridge heaters disposed in these grooves. Use of this split heater plate reduces the difference in set temperature of the heater and the observed surface temperature of tooling affixed to the top of the split heater plate, while also delivering up to 15% improvements in the speed of the manufacturing operations relying on that split heater plate.

13 Claims, 5 Drawing Sheets

APPARATUS AND METHOD FOR HEATED PULP PRESS WITH INTEGRAL ELEMENTS FOR IMPROVED EFFICIENCIES

CROSS REFERENCE TO RELATED APPLICATIONS

This application claims priority to U.S. provisional patent application Ser. No. 63/450,118, filed on Mar. 6, 2023, which is incorporated by reference.

TECHNICAL FIELD

The present invention relates to apparatus and methods of making molded pulp products using an industrial press fitted with specialized, heated tooling and, more particularly, to a heater plate arrangement for such operations in which a cartridge heater element is disposed

BACKGROUND

While the use of tooling on industrial press machines is well-known, the exigencies of molding paper and pulp products present a number of unique challenges. Foremost, the commoditized nature of paper and pulp products (e.g., plates, containers, and the like) means that manufacturing processes should be as efficient as possible, both in terms of time and energy required to operate the manufacturing line. Further, the need to apply heat to wet mixtures results in the generation of steam during the pressing process, and repeated exposure to steam and heat can stress the tooling and related press apparatus (e.g., corrosion, wear, heat- or moisture-induced deformities, etc.). As a result, even small improvements or alterations can be beneficial but extraordinarily difficult to implement.

U.S. Pat. No. 3,305,434 describes a manufacturing method for pressed paperboard stock with high moisture content in which pressure, heat, and suction are used to form the final product. This patent recognizes and addresses the specific issues associated with the evolution of steam and vapor, including how to vent and remove the same from the die/press. Notably, it relies on permanent heating elements positioned beneath and affixed to the base of the die itself.

The nature of the products being molded also presents challenges, as described in U.S. Pat. No. 4,514,353. This patent also suggests positioning a heater proximate to the body of the die.

A number of more specialized heated presses have also been developed. U.S. Pat. No. 6,932,753 identifies shortcomings of the dual ring heaters required by many paperboard container presses. As a solution, this patent recommends the use of multi-part, movable dies so as to allow easier access to the cast-in heating elements associated with each die.

U.S. Pat. No. 9,011,308 provides further information on the state of the art. U.S. Pat. No. 8,545,202 proposes molding machine in which the rim of a cardboard-pressed base is sealed by movable collar and seal rings, so as to allow alterations to the base in order to create different products.

United States Patent Publication 2016/0368235 describes processes for molding wet paper blanks. The process relies on clamping and heating two cooperating molds to define a cavity, with special considerations for detaching/cutting the resulting paper product from the molds.

All of the aforementioned patent documents are incorporated by reference for background purposes.

In view of the foregoing, a paper or pulp press in which the tooling can be changed quickly without reconfiguring the heating elements or other components on the molding machine/press is needed. Further, an operation in which the interface between the tooling and heating elements are both modular and designed for efficient heat transfer would be welcomed.

SUMMARY

A pulp molding machine includes a heated press that dries and finishes various types of molded pulp products. The size, shape, and basic functionality of the product will vary depending upon the tooling fitted to the press. Generally, the tooling will include a plurality of upper and lower dies which, when coupled together, define a cavity that is filled by pulp.

In addition to various conventional features, the molding machine will employ a split heater plate assembly. This assembly has a laminar construction, with an insulator plate, a lower/bottom heating element plate, and an upper/top tooling plate. Cartridge heating elements are disposed in a series of regular formed channels in the heating element plate, while the tooling plate includes channels for management of fluids (liquid and/or gas) that may be encountered during the molding and pressing process. Electrical and fluid management manifolds and connections are provided to allow integration of the assembly into any number of pressing apparatus commonly found in pulp molding machines. Notably, the tooling is affixed to the top tooling plate without the need to disrupt the cartridge heaters, whereas the close proximity of those heaters to the cartridge heaters eliminates direct and/or additional heating elements connected to individual tools, thereby enabling a pulp molding machine whose tooling can be quickly changed out, with a resultant reduction in errors owing to the elimination of individual wiring arrangements for each tool set.

Further reference should be made to the appended or incorporated information embraced by this disclosure, including any and all claims, drawings, and description. While specific embodiments may be identified, it will be understood that elements from one described aspect may be combined with those from a separately identified aspect. In the same manner, a person of ordinary skill will have the requisite understanding of common processes, components, and methods, and this description is intended to encompass and disclose such common aspects even if they are not expressly identified herein.

DESCRIPTION OF THE DRAWINGS

Operation of the invention may be better understood by reference to the detailed description taken in connection with the following illustrations. These appended drawings form part of this specification, and any information on/in the drawings is both literally encompassed (i.e., the actual stated values) and relatively encompassed (e.g., ratios for respective dimensions of parts). In the same manner, the relative positioning and relationship of the components as shown in these drawings, as well as their function, shape, dimensions, and appearance, may all further inform certain aspects of the invention as if fully rewritten herein. Unless otherwise stated, all dimensions in the drawings are with reference to inches, and any printed information on/in the drawings form part of this written disclosure.

In the drawings and attachments, all of which are incorporated as part of this disclosure:

FIG. 1A is a sectional perspective view of the pulp molding machine according to certain aspects, while

DETAILED DESCRIPTION

Figure 1A:
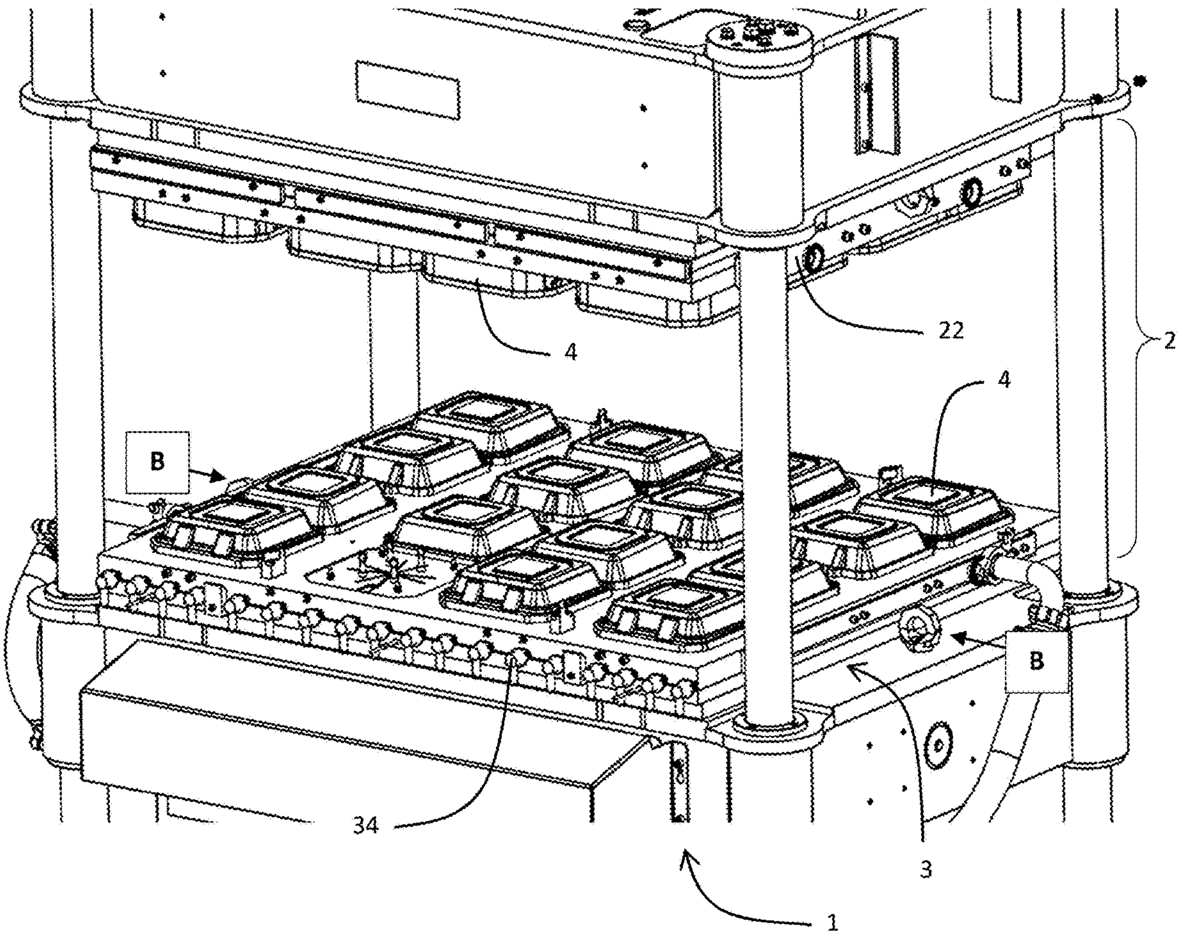
Figure 1B:
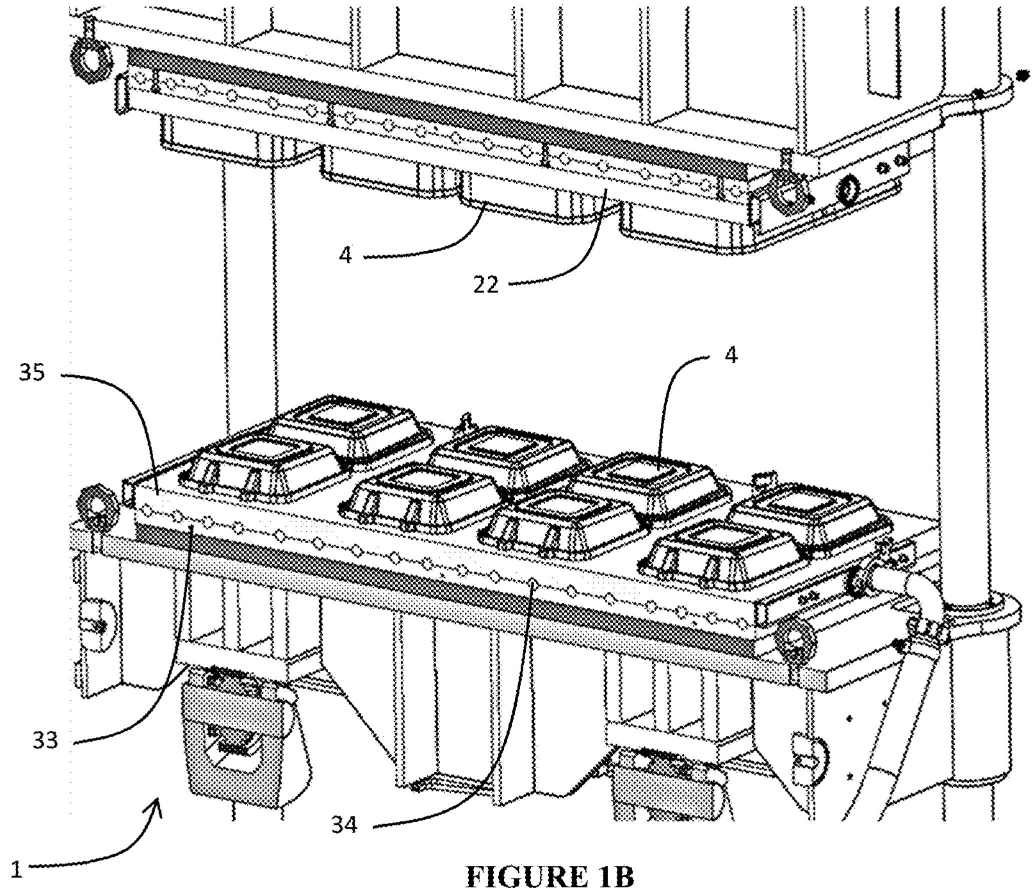
FIG. 1B is a cross sectional view taken long a transverse centerline (indicated by line B-B in FIG. 1A).
Figure 2:
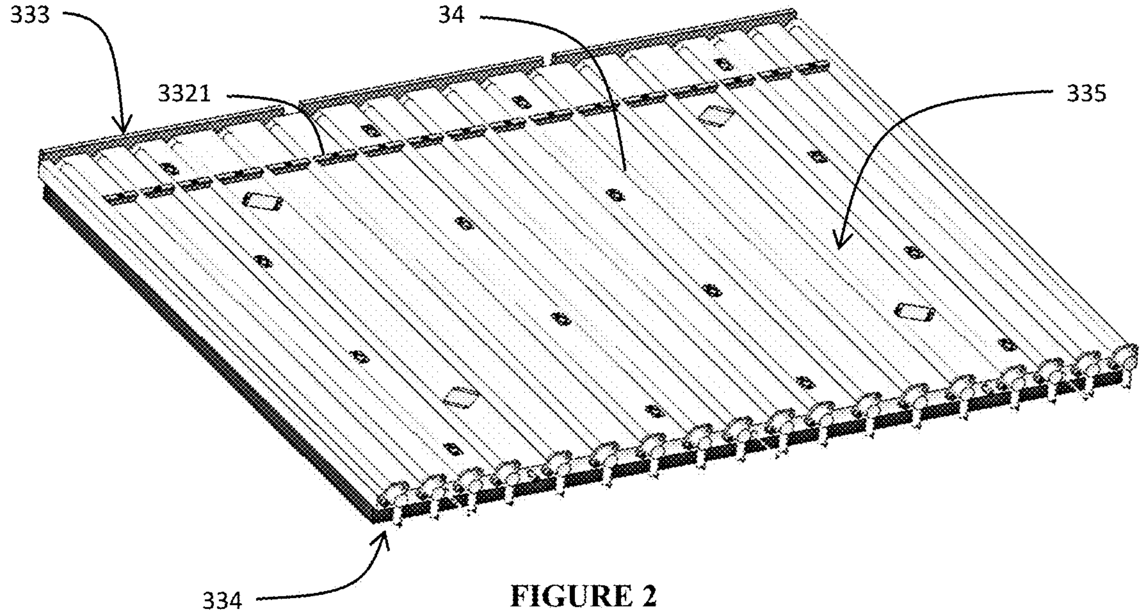
FIG. 2 is an isolated perspective view of the cartridge heating elements seated within the grooves of the lower heater plate.
Figure 3A:
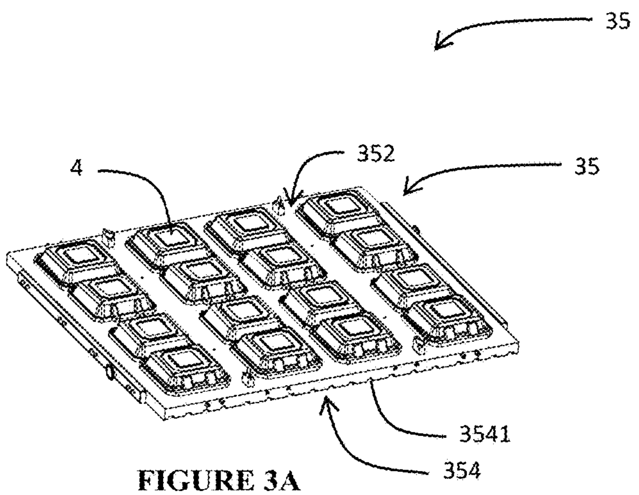
FIGS. 3A and 3B are top perspective views, respectively speaking, of the top tooling plate (with tooling attached) and the lower heat plate (with the cartridge heating elements omitted).
Figure 4A:
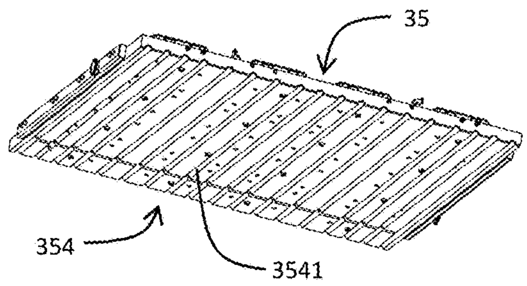
FIGS. 4A and 4B are bottom perspective views, respectively speaking, of the top tooling plate (with tooling attached) and the lower heat plate (with the cartridge heating elements omitted).
Figure 3B:
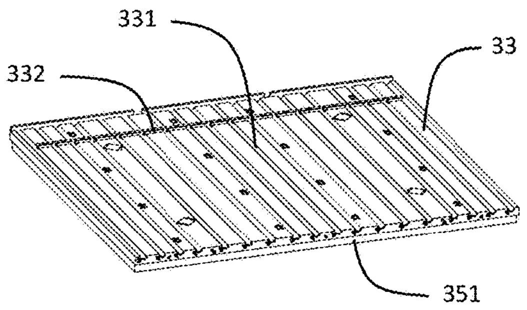
Figure 4B:
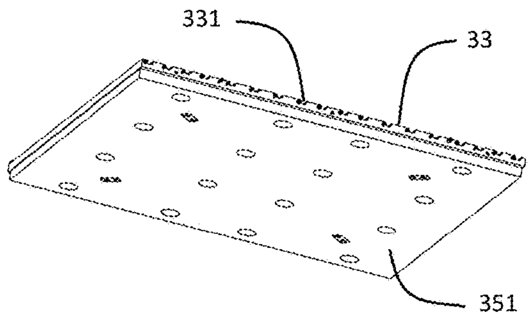
Figure 5A:
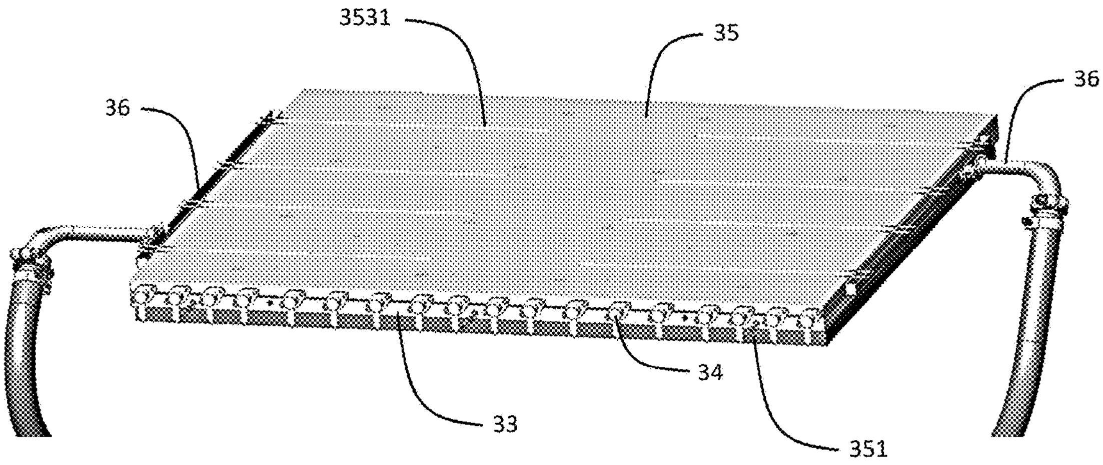
FIGS. 5A through 5C are progressive horizontal cross sectional views of the split heater plate assembly used in FIG. 1A, in which one row of tooling (left-most) on the top tooling plate has been omitted. All of these Figures highlight the fluid management ducting in and attached to the split heater plate assembly.
Figure 5B:
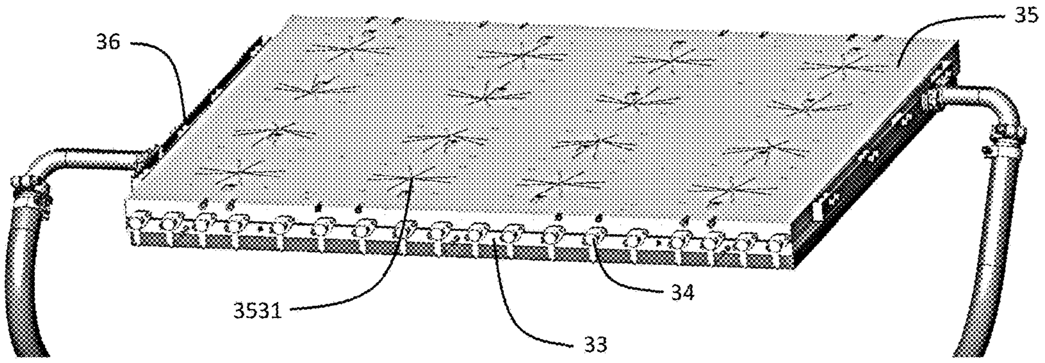
Figure 5C:
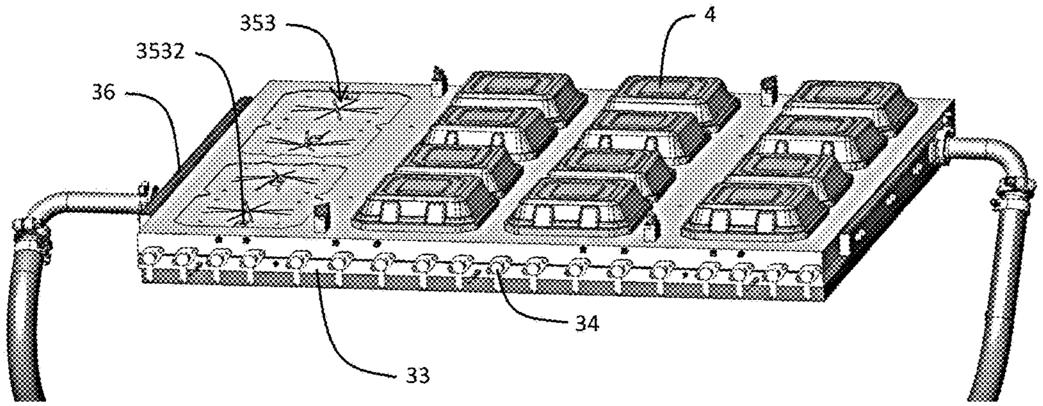

The following description and any reference to the drawings and claims are merely exemplary, and nothing should limit alternatives and modifications that may be possible while adhering to the spirit and scope of the invention. Also, the drawings form part of this specification, and any written information in the drawings should be treated as part of this disclosure. In the same manner, the relative positioning and relationship of the components as shown in these drawings, as well as their function, shape, dimensions, and appearance, may all further inform certain aspects of the invention as if fully rewritten herein.

As used herein, the words "example" and "exemplary" mean an instance or illustration of broader concept; however, use of these words do not necessarily indicate a required, key, or preferred aspect or embodiment. Similarly, the word "or" is intended to be inclusive rather an exclusive, unless context suggests otherwise. As an example, the phrase "A employs B or C," includes any inclusive permutation (e.g., A employs B; A employs C; or A employs both B and C). As another matter, the articles "a" and "an" are generally intended to mean "one or more" unless context suggest otherwise. Approximating language such "about" or "substantially" may be used (or, when consistent with context and reasonable expectations, implied) so as to modify quantitative representations, in which cases the stated value (s)/range(s) may be modified within the reasonable expectations of this art field and not necessarily limited to the precise value specified (unless specifically indicated herein as being precise or critical).

The descriptions and drawings in this disclosure, and any written matter within the drawings should be deemed to be reproduced as part of this specification. Insofar as the tooling described herein deliberately impart shape to the molded pulp products, it will be understood that tool and die may be used synonymously throughout this description. Nevertheless, a person of skill in this field will interpret this description in a manner that is consistent with the state of the art at the time of this invention.

In conventional pulp molding machines, including those described above, the inventors observed up to a 60° C. gradient between the set temperature of heating elements associated with the press and the actual surface temperature of the tool/die itself. In some instances, the gradient is so great that it becomes impractical to compensate for it by using a higher set temperature, especially in situations where that set temperature might approach or exceed the softening or melting point of the materials used to construct the tool itself (e.g., most of the common aluminum alloys used for tooling will soften to less than one half their original yield strength well before approaching the actual melting point of the alloy/metal). Further still, it is important to note that minimal yield strengths (e.g., at least 20 ksi, at least 30 ksi, etc.) must also be maintained throughout the anticipated temperature cycling range, irrespective of the comparative loss of yield strength. These and other issues with respect to heating are also described in some of the cited references above.

Further investigation revealed that primary contributing factor to this heat transfer problem originated with the junction between the heater plate (i.e., the planar member associated with heating element(s) required for the molding process) and the tooling plate (i.e., the planar member—usually resting atop the heater plate—to which the tooling was attached). As a result, it is common for pulp molding machines to provide an additional electric heating element in contact with the tool itself, thereby insuring sufficient heat is provided at the surface where pulp first contacts the tool.

While this arrangement was useful in addressing heat transfer issues, it is inefficient. First, the solution requires a plurality of individual heating elements associated with each tool. In addition to the added cost, each element had to be unwired and rewired whenever the tooling was changed (e.g., in order to change the type of molded product being produced). This resulted in more downtime and slower production times for the press/manufacturing operation.

With reference to FIGS. 1A through 6C showing various aspects of the invention, a pulp molding machine 1 includes a heated press assembly 2. Generally speaking, during molding operations, two opposing plates, each carrying a cooperating tool or die shaped to form a molded pulp product, are brought together. Wet pulp (i.e., having a soft but pliable form, usually with solids content of <50 wt. %) is positioned between or provided to the interstices between the cooperating tools/dies, which will eventually be joined together to confine and further process the wet pulp into a desired final shape. The assembly 2 also includes fluid manifold structures 36 to manage the various liquids and gases evolved from or involved with this molding operation. The manifolds 36 will be fluidically connected to relevant channels on the press plates, as well other venting and supply tubes within the machine 1. The machine 1 will also contain sufficient controllers to manage and sequence the various movements and operations involved with the molding process. The end result is that a sufficient amount of moisture content will be removed from the wet pulp during the molding process to allow for the resultant pulp product to be handled, packaged, or otherwise processed further (depending upon the nature of the product and the configuration of the manufacturing line)

Of particular interest to the inventors, a novel split plate heater assembly 3 has been developed to replace conventional heater plates normally found in the press assembly 2. The split heater plate assembly generally comprises two flat planar members 33, 35 coupled together and fixed to the press assembly 2 opposite a cooperating plate 22. As shown herein, this plate 22 is provided on the top portion of the press assembly 2 and it carries interchangeable tooling/dies 4, although it will be understood that a split heater plate could be implemented here as well.

Members 33, 35 should have comparable thicknesses and similar and cooperating peripheral shapes, usually rectilinear so as to be easily confined within the machine 1 while maximizing the number of—and even more preferably the most efficient spacing for—the individual tool/dies 4. Square and rectangular shapes are most common. The members 33, 35 are also preferably made from the same material or materials having similar heat expansion and other thermal properties.

The lower or bottom member 33 includes a top facing 335. A series of grooves 331 are formed in this facing 335, with the grooves having a rounded shape that conforms to the contours of a series of cartridge heaters 34 that may be placed within the groove 331. The grooves 331 are spaced apart and preferably rounded channels running on a straight line from one edge 333 to an opposing edge 334 of the plate 33. In some aspects, all of the channels 331 are parallel and spaced apart at the same distance. In other aspects, a staggered or offset pattern might better accommodate tools 4 where features, compartments, or segments may not be symmetrical or otherwise comparably sized (although these arrangements may not be as versatile as the regularly spaced embodiment shown here).

One or more retainer channels 332 run across the member 33 so as to intersect with each groove 331. Cooperating retainer elements 3321 are held within the channel 332, and these elements 3321 serve to restrain and retain the positioning of the heaters 34. The channels should be sized to maximize heat transfer from the heaters 34 into/toward the tools 4 (e.g., through plate 35).

Lower base plate 33 may be carried on an insulator plate 351. It may also be imparted with threaded ports to allow attachment of the various adjacent components described herein. Other fixtures may be attached along the edges to accommodate electrical connections for the heating elements 34 and/or to facilitate mounting the plate 33 within the assembly 2 and guiding the movement of the assembly 3 within the press assembly 2.

An upper or top member 35 is coupled to the base plate 33. Top plate 35 may include a plurality of corresponding grooves 3541 in its bottom facing 354. Similarly, channels or other features can be provided to accommodate the retainer elements 3321, as well as any other exposed features from the bottom member 33. Notably, the interface between members 33, 35 should be configured to maximize heat transfer, although the provision of grooves 3541 allows the heater 34 to directly contact and heat top member 35, thereby improving efficiency.

Top plate 35 has a top facing 352 onto which interchangeable tools or dies 4 may be attached. These tools 4 can be positioned within individual tooling receptacles 353. Notably, receptacles 353 may include fluid flow channels 3531 and/or fasteners 3532. The flow channels 3531 accommodate fluids necessarily encountered during pulp molding, and these will connect to the aforementioned manifolds 36. As seen herein, the channels 3531 may be embedded in the surface and/or tunnel (i.e., be completely encased by) the material forming the top plate 35.

The receptacles 353 are preferably arranged in regular, spaced apart arrays. They are also positioned immediately above the grooves 331 (and optionally 3541) so that the cartridge heaters 34 can and will quickly heat the tools 4 held in the receptacles 353.

Figure 6:
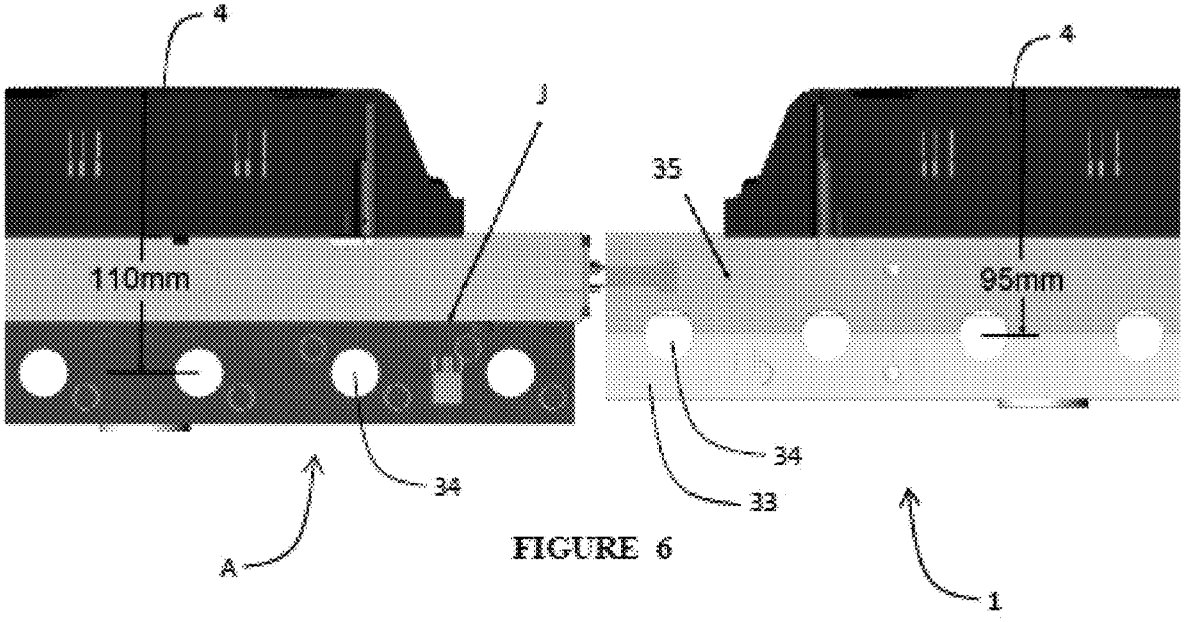
FIG. 6 is a schematic side view comparison of a conventional or typical heater plate arrangement and the arrangement of the split heater plate as contemplated by FIGS. 1A through 5C.

Comparative performance of conventional heater plate was observed in comparison to the split heater plate assembly described above. FIG. 6 schematically illustrates key differences of the inventive split heater assembly 1 and a prior art arrangement A.: because the cartridge heaters are encased within the heater assembly, the height of the assembly is reduced. Without wishing to be bound by any particular theory of operation, the inventors believe this reduced height enables improved thermal transfer.

In particular, assembly 1 reduces the distance from the core of heater 35 by well over 10% in comparison to prior art assembly A in which heater elements 34 are embedded in the element plate so as to eliminate the inefficiencies of other prior art designs in which the heater 35 is coupled to the tool 4 (or positioned immediately underneath it). Further, arrangement A requires an additional heat transfer junction J that is eliminated in the split plate assembly 1.

Figure 7:
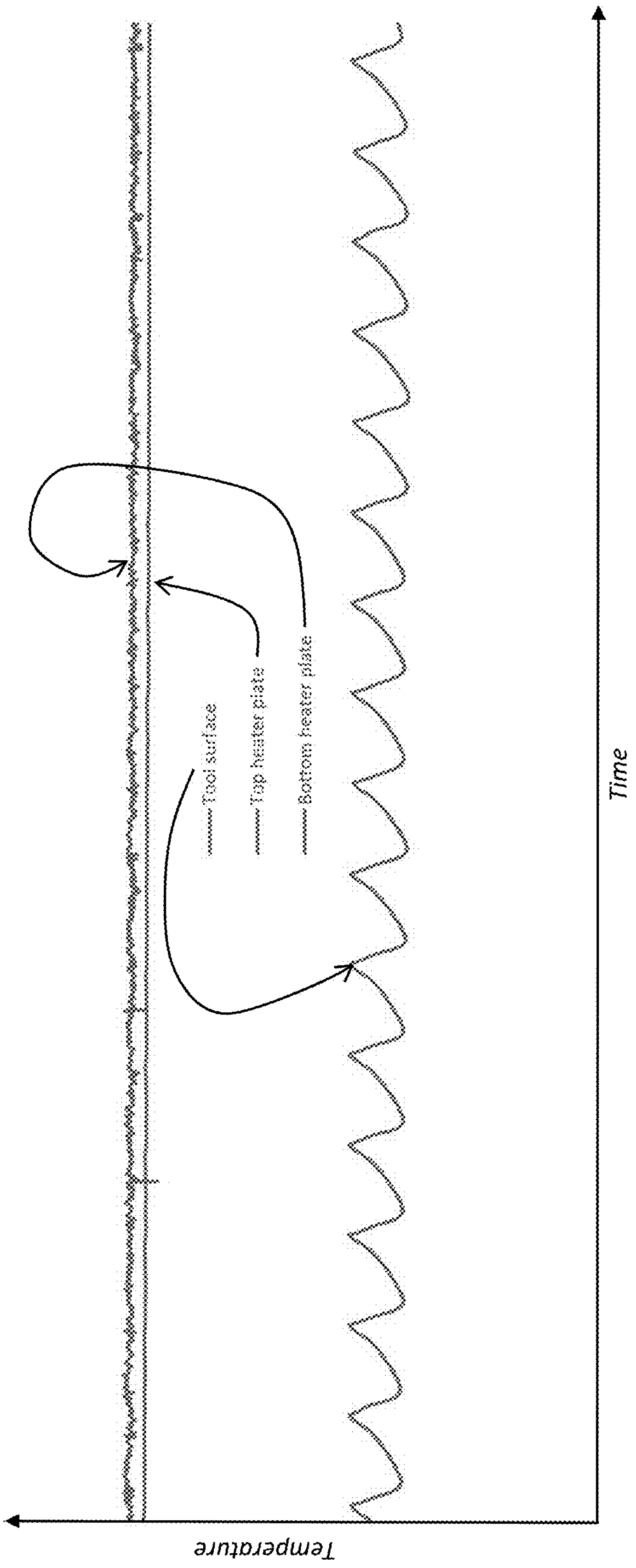
FIG. 7 illustrates the observed temperatures of the tool surface (bottom curve), the bottom plate (middle curve), and the upper plate (top curve) of the split heater plate (as contemplated by FIGS. 1A through 5C) as temperature is cycled over time.

With further reference to FIG. 7, once the split heater assembly attains steady-state performance (i.e., a point in time at which cycling associated with the press operation is maintained in a repeatable and regular range of temperature variation), the temperature of the outermost surface of the tooling is 78% or greater in comparison to the set temperature of the cartridge heater (e.g., if the set temperature is 100° C., the observed temperature on the outermost surface of the tool will be at least 78° C.)). In contrast, the conventional or typical design shown on the left side of FIG. 6 tends to take longer to arrive at a steady state and the outer tooling temperature is 75% or less in comparison to the set temperature.

Thus, the conventional design requires more time to arrive achieve the desired and necessary temperatures to remove moisture. In turn, the longer time results in fewer operations per minute (i.e., the cycle time for manufacturing a part on the same pulp molding press). Disclosed aspects of the invention herein can be completed at least 10% and up to almost 20% more quickly than its conventional counterpart (i.e., a tool coupled to a heating plate with a standard configuration). Stated differently, the speed of molding operations using a split plate heater assembly is about 15% faster in comparison to an identical operation using a conventionally configured heater plate, both as shown in FIG. 6.

Also, again with reference to FIG. 7, the split heater plate contemplated herein insures that the top plate maintains a temperature that is 98% or more in comparison to that of the bottom plate. This improved thermal performance within the assembly can be attributed to the elimination of a junction that was otherwise present in the typical design, as well as the comparatively shorter profile (i.e., the thickness of the plates, at least in terms of distance from the heating element to the top of the tool/die).

It will be understood that the pulp molding machines described herein will have a number of common elements, irrespective of whether the inventive split heater plate is used. For example, each machine requires an axial/vertical driver, such as a electric, hydraulic, or pneumatic jack system. More specifically, the tooling and heating plates will be mounted on a common frame that brings the top and bottom dies into close proximity. Fluid and pressure management systems are also required in order to vent vapors evolved during the pressing process, as well as to position the tools and wet pulp as may be required for manufacture of products. Lastly, an ejection or product removal system allows for the finished and molded products to be ejected or removed from the tooling plate so that the process may be repeated. Insofar as efficiency and high speed operations are desired, these various systems and elements may be automated and controlled so as to allow the pulp molding machine to be integrated with a larger manufacturing line.

In one aspect, the invention is a split heater plate assembly configured to operate in conjunction with any pulp molding machine incorporating a heated press. This split heater plate assembly includes a flat planar base member with a plurality of grooves disposed in a top facing; at least one elongated, cylindrical heating element seated in one of the plurality of grooves; and a flat planar top member having a bottom interfacing with the base member and the heating element (s), a top, and a peripheral a shape complimentary to the base member. The top member includes a plurality of tooling receptacles integrally disposed on the top, wherein each of the plurality of tooling receptacles is disposed on a top facing and aligned so as to be positioned directly above one of the heating elements. Additional aspects may include any one or combination of the following:

- wherein every one of the plurality of grooves receives a corresponding heating element;
- wherein the plurality of tooling receptacles includes fluid flow channels at least partially embedded in the top facing of the top member;
- wherein the plurality of tooling receptacles includes fasteners to selectively attach molding tools thereto;
- wherein a bottom facing of the top member includes a plurality of corresponding grooves, with each groove configured to align with and receive and an exposed facing of one of the heating elements;
- wherein the grooves extend from one edge to an opposing edge of the base member;
- wherein the grooves are regularly spaced apart;
- wherein the all of the grooves are parallel; and
- wherein a retainer channel is formed in the top facing of the base member, said retainer channel aligned perpendicular to and intersecting with each one of the plurality of grooves, and a plurality of retainers secured in the retainer channel to maintain the positioning of the every heating element provided in the plurality of grooves.

Another aspect of the invention contemplates a pulp molding machine to create molded pulp products. Here, the machine includes a split heater plate assembly having: i) a lower plate member with a series of spaced apart channels each running transversely across a top facing of the lower plate member, and ii) an upper plate member configured to couple to the top facing of the lower plate member so as to cover and enclose the spaced apart channels, wherein interchangeable tooling is detachably fixed to a top facing of the upper plate directly above each one of the spaced apart channels; a plurality of cartridge heaters with individual cartridge heaters seated in each of the spaced apart channels; and a tooling press assembly having interchangeable tooling detachably fixed to a lower facing. Also, the split heater plate and the tooling press assembly are configured to move into close proximity during a molding operation, and/or the cartridge heaters are in thermal communication with interchangeable tooling through the upper plate member so that, after attaining steady set operation, an observed temperature on an outermost surface of the interchangeable tooling in the split heater plate is at least 78% or greater than a set temperature of the plurality of cartridge heaters. A further aspect is that an observed temperature of the upper plate in the split heater plate assembly is within 98% of an observed temperature of the lower plate in the split heater plate assembly at all times during the molding operation.

Still other aspects of the invention are possible. Further reference to the foregoing description and the appended claims, in combination with the background information provided herein, help to elucidate these aspects.

All components of the system should be made of materials having sufficient flexibility and structural integrity, as well as a chemically inert nature. The materials should also be selected for workability, cost, and weight. Tooling made from aluminum and alloys thereof is particularly useful. With respect to the other components, other metals (e.g., various grades of steel, zinc, etc.), alloys of such metals, and/or other composites may be used in place of or in addition to conventional materials. The heating elements can be electrically heated by way of resistive coils and/or ceramic heating elements.

References to coupling are to be understood as encompassing any of the conventional means used in this field. This may take the form of snap- or force fitting of components, although threaded connections, bead-and-groove, "beverage can" and other forms of crimping, and bayonet-style/slot-and-flange assemblies could be employed. Adhesive and fasteners (screws, nut/bolt, etc.) could also be used. All coupling components must be judiciously selected so as to retain the functionality of the assembly.

In the same manner, engagement may involve coupling or an abutting relationship. These terms, as well as any implicit or explicit reference to coupling, will should be considered in the context in which it is used, and any perceived ambiguity can potentially be resolved by referring to the drawings.

Unless otherwise noted, all reported values are in common units accepted in this field, with observations made at ambient temperatures and pressures. Any references to atomic or molecular configurations will be in standard units, with weight averages given preference unless otherwise explicitly stated.

Although the present embodiments have been illustrated in the accompanying drawings and described in the foregoing detailed description, it is to be understood that the invention is not to be limited to just the embodiments disclosed, and numerous rearrangements, modifications and substitutions are also contemplated. The exemplary embodiment has been described with reference to the preferred embodiments, but further modifications and alterations encompass the preceding detailed description. These modifications and alterations also fall within the scope of the appended claims or the equivalents thereof.

What is claimed is:

1. A split heater plate assembly configured to operate in conjunction with a pulp molding machine, the split heater plate assembly comprising:

a flat planar base member, the flat planar base member having a plurality of grooves disposed in a top facing of the flat planar base member;

at least one elongated, cylindrical cartridge heating element seated in at least one of the grooves in the plurality of grooves; and a flat planar top member, the flat planar top member having a bottom facing adapted to interface with the top facing of the flat planar base member and the at least one elongated, cylindrical cartridge heating element, a top side opposite the bottom facing, and a peripheral shape complimentary to the base member, wherein:

the flat planar top member includes a plurality of tooling receptacles integrally disposed on the top side, wherein each of the tooling receptacles in the plurality of tooling receptacles is aligned so as to be positioned directly opposite at least one of the at least one elongated, cylindrical cartridge heating element, and interchangeable tooling is detachably fixed to at least one tooling receptacle in the plurality of tooling receptacles;

wherein:

the at least one elongated, cylindrical cartridge heating element is electrically heated;

the at least one elongated, cylindrical cartridge heating element is in direct thermal communication with the interchangeable tooling via conductive heat transfer from the at least one elongated, cylindrical cartridge heating element through the flat planar top member to the interchangeable tooling; and the interchangeable tooling is free of any heating element disposed therein.

2. The assembly of claim 1 wherein every one of the grooves in the plurality of grooves receives a corresponding elongated, cylindrical cartridge heating element.

3. The assembly of claim 1 wherein the plurality of tooling receptacles includes fluid flow channels at least partially embedded in the top side of the flat planar top member.

4. The assembly of claim 1 wherein the plurality of tooling receptacles includes molding tool fasteners.

5. The assembly of claim 1 wherein the bottom facing of the flat planar top member includes a plurality of corresponding grooves, with each corresponding groove in the plurality of corresponding grooves being configured to align with and receive an exposed facing of one of the at least one elongated, cylindrical cartridge heating element.

6. The assembly of claim 1 wherein the grooves in the plurality of grooves extend from one edge to an opposing edge of the flat planar base member.

7. The assembly of claim 1 wherein the grooves in the plurality of grooves are regularly spaced apart.

8. The assembly of claim 1 wherein all of the grooves in the plurality of grooves are parallel.

9. The assembly of claim 1 wherein a retainer channel is formed in the top facing of the flat planar base member, said retainer channel aligned perpendicular to and intersecting with each one of the grooves in the plurality of grooves, and a plurality of retainers secured in the retainer channel to maintain the positioning of every elongated, cylindrical cartridge heating element of the at least one elongated, cylindrical cartridge heating element provided in the plurality of grooves.

10. A pulp molding machine for manufacturing molded pulp products comprising:

the split heater plate assembly according to claim 1;

a tooling press assembly having complimentary interchangeable tooling detachably fixed to a lower facing;

wherein the split heater plate assembly and the tooling press assembly are configured to move into close proximity during a molding operation so that the interchangeable tooling on the split heater plate assembly and the complimentary interchangeable tooling on the tooling press assembly collectively define a pulp product mold; and wherein the at least one elongated, cylindrical cartridge heating element is configured to be in thermal communication with the top member of the split heater plate assembly so that, after attaining steady state operation, an observed temperature on an outermost surface of the interchangeable tooling on the split heater plate assembly is at least 78% or greater than a set temperature of the at least one elongated, cylindrical cartridge heaters heating element.

11. The machine of claim 10 configured to provide an observed temperature of the flat planar top member of the split heater plate assembly within 98% of an observed temperature of the flat planar base member of the split heater plate assembly at all times during the molding operation.

12. A pulp molding machine for manufacturing molded pulp products comprising:

a split heater plate assembly having: i) a lower plate member with a series of spaced apart channels each running transversely across a top facing of the lower plate member, and ii) an upper plate member configured to couple to the top facing of the lower plate member so as to cover and enclose the spaced apart channels, wherein interchangeable tooling is detachably fixed to a top side of the upper plate member directly opposite each one of the spaced apart channels;

a plurality of elongated, cylindrical cartridge heating elements with an individual elongated, cylindrical cartridge heating element seated in each of the spaced apart channels;

a tooling press assembly having complimentary interchangeable tooling detachably fixed to a lower facing;

wherein the split heater plate assembly and the tooling press assembly are configured to move into close proximity during a molding operation;

wherein the interchangeable tooling is free of any heating element disposed therein; and wherein the plurality of elongated, cylindrical cartridge heating elements are configured to be in thermal communication with the interchangeable tooling through the upper plate member so that, after attaining steady state operation, an observed temperature on an outermost surface of the interchangeable tooling of the split heater plate assembly is at least 78% or greater than a set temperature of the plurality of elongated, cylindrical cartridge heating elements.

13. The machine of claim 12 configured to provide an observed temperature of the upper plate member of the split heater plate assembly within 98% of an observed temperature of the lower plate member of the split heater plate assembly at all times during the molding operation.

* * * * *